United States Patent
Gianzero et al.

(10) Patent No.: US 6,765,386 B2
(45) Date of Patent: Jul. 20, 2004

(54) GALVANIC METHOD OF MEASURING ELECTRICAL ANISOTROPY

(75) Inventors: Stanley C. Gianzero, Austin, TX (US); Li Gao, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 10 days.

(21) Appl. No.: 10/119,891

(22) Filed: Apr. 10, 2002

(65) Prior Publication Data

US 2003/0197510 A1 Oct. 23, 2003

(51) Int. Cl.$^7$ .................................................. G01V 3/20
(52) U.S. Cl. ............................................. 324/367; 324/371
(58) Field of Search ............................... 324/367, 371, 324/373, 374

(56) References Cited

U.S. PATENT DOCUMENTS

| | | | | |
|---|---|---|---|---|
| 2,786,178 A | * | 3/1957 | Doll ............................ | 324/367 |
| 3,405,351 A | * | 10/1968 | Schuster ....................... | 324/367 |
| 3,479,581 A | * | 11/1969 | Runge ........................ | 324/338 |
| 4,251,773 A | * | 2/1981 | Cailliau et al. .............. | 324/347 |
| 4,302,722 A | * | 11/1981 | Gianzero ..................... | 324/339 |
| 4,468,623 A | * | 8/1984 | Gianzero et al. ............ | 324/367 |
| RE32,070 E | * | 1/1986 | Vezin ......................... | 324/347 |
| 5,008,625 A | * | 4/1991 | Chen .......................... | 324/351 |
| 5,656,930 A | * | 8/1997 | Hagiwara ..................... | 324/339 |
| 6,191,588 B1 | | 2/2001 | Chen ........................... | 324/367 |
| 6,359,438 B1 | | 3/2002 | Bittar | |
| 6,373,254 B1 | | 4/2002 | Dion et al. | |
| 6,586,939 B1 | * | 7/2003 | Fanini et al. ................ | 324/339 |

OTHER PUBLICATIONS

Moran et al., "Effects of formation anisotropy on resistivity-logging measurements," Geophysics, vol. 44, No. 7, Jul. 1079, pp. 1266–1286.*
GB Search Report For Application No. GB 0308209.6.

* cited by examiner

Primary Examiner—N. Le
Assistant Examiner—Darrell Kinder
(74) Attorney, Agent, or Firm—Conley Rose, P.C.

(57) ABSTRACT

A logging tool is disclosed for measuring the resistive anisotropy of formations around a borehole. The logging tool includes a set of electrodes that contact a wall of the borehole. The set of electrodes includes a first pair of current electrodes spaced apart vertically, and a second pair of current electrodes spaced apart horizontally. Between the first and second pair of current electrodes are two or more measurement electrodes that measure a vertical axis voltage difference and a horizontal axis voltage difference caused by currents flowing between the pairs of current electrodes. A resistive anisotropy can be calculated from the measured voltage differences. A third pair of current electrodes oriented perpendicularly with respect to the first and second pair of current electrodes may be provided with corresponding measurement electrodes if it is desired to measure the biaxial resistive anisotropy of the formation.

11 Claims, 2 Drawing Sheets

GALVANIC METHOD OF MEASURING ELECTRICAL ANISOTROPY

BACKGROUND

1. Field of the Invention

The present invention generally relates to the measurement of electrical characteristics of formations surrounding a wellbore. More particularly, the present invention relates to a method for determining horizontal and vertical resistivities in anisotropic formations.

2. Description of Related Art

It is well known that subterranean formations surrounding an earth borehole may be anisotropic with regard to the conduction of electrical currents. The phenomenon of electrical anisotropy is generally a consequence of either microscopic or macroscopic geometry, or a combination thereof, as follows.

Many subterranean formations include sedimentary strata in which electrical current flows more easily in a direction parallel to the bedding planes, as opposed to a direction perpendicular to the bedding planes. One reason is that a great number of mineral crystals possess a flat or elongated shape (e.g., mica or kaolin). At the time they were laid down, they naturally took on an orientation parallel to the plane of sedimentation. The interstices in the formations are, therefore, generally parallel to the bedding plane, and the current is able to easily travel along these interstices which often contain electrically conductive mineralized water. Such electrical anisotropy, sometimes called microscopic anisotropy, is observed mostly in shales.

Many subterranean formations also include a series of relatively thin beds having different lithological characteristics and, therefore different resistivities. In well logging systems, the distances between the electrodes or antennas are great enough that the volume involved in a measurement may include several such thin beds. When individual layers are neither delineated nor resolved by a logging tool, the tool responds to the formation as if it were a macroscopically anisotropic formation. A thinly laminated sand/shale sequence is a particularly important example of a macroscopically anisotropic formation.

If a sample is cut from a subterranean formation, the resistivity of the sample measured with current flowing parallel to the bedding planes is called the transverse or horizontal resistivity $\rho_h$. The inverse of $\rho_h$ is the horizontal conductivity $\sigma_h$. The resistivity of the sample measured with a current flowing perpendicular to the bedding plane is called the longitudinal or vertical resistivity, $\rho_v$, and its inverse the vertical conductivity $\sigma_v$. The uniaxial anisotropy coefficient $\lambda$ is defined as: $\lambda = \sqrt{\sigma_h/\sigma_v}$.

In some formations, there is an added complication, in that even for currents flowing parallel to the bedding plane, the conductivity varies with direction. This situation is termed "biaxial anisotropy", and it is characterized by three different conductivity values along each of three different axes. The conductivity for currents flowing along the z-axis (i.e., perpendicular $_z$, while the conductivity for currents flowing along the x axis (i.e., $_x$. The conductivity for $_y$. The biaxial anisotropy coefficients $\lambda_{xz}$, $\lambda_{yz}$ are defined as $\lambda_{xz} = \sqrt{\sigma_x/\sigma_z}, \lambda_{yz} = \sqrt{\sigma_y/\sigma_z}$.

In situations where the borehole intersects the formation substantially perpendicular to the bedding planes, conventional resistivity logging tools are sensitive almost exclusively to the horizontal component of the formation resistivity. For induction tools, this is a consequence of the induced currents flowing in horizontal planes. For Galvanic devices, the lack of sensitivity to anisotropy is even more stringent due to the "paradox of anisotropy", which states that any array of electrodes or sensors deployed along the axis of a wellbore in a vertical well is insensitive to the vertical component of resistivity, despite the intuitive expectation to the contrary.

A number of non-Galvanic logging tools have been designed to detect uniaxial anisotropy. See, for example, U.S. Pat. No. 4,302,722, issued Nov. 24, 1981. Such tools are unable to measure biaxial anisotropy, and in addition, they are ineffective in non-conductive, oil-based drilling muds. A tool that can function in such environments, and which could measure biaxial anisotropy, would be desirable.

SUMMARY OF THE INVENTION

Accordingly, there is disclosed herein a logging tool that can measure the resistive anisotropy of formations around a borehole. In one embodiment, the system comprises a logging tool coupled to a surface unit. The logging tool includes a set of electrodes that contact a wall of the borehole, with the set of electrodes including a first pair of current electrodes spaced apart vertically, and a second pair of current electrodes spaced apart horizontally. Between the first pair of current electrodes is two or more measurement electrodes that measure a vertical axis voltage difference caused by a current flowing between the first pair of current electrodes. Similarly, two or more measurement electrodes between the second pair of current electrodes measure a horizontal axis voltage difference caused by a current flowing between the second pair of current electrodes. A resistive anisotropy can be calculated from the measured voltage differences. A third pair of current electrodes oriented perpendicularly with respect to the first and second pair of current electrodes may be provided. Measurement electrodes between the third pair of current electrodes may be used to measure a third voltage difference that may be used with the other voltage differences to measure the biaxial resistive anisotropy of the formation. The anisotropy calculations are preferably performed by the surface unit after it receives measurements from the logging tool.

BRIEF DESCRIPTION OF THE DRAWINGS

A better understanding of the present invention can be obtained when the following detailed description of the preferred embodiment is considered in conjunction with the following drawings, in which.

Figure 1:
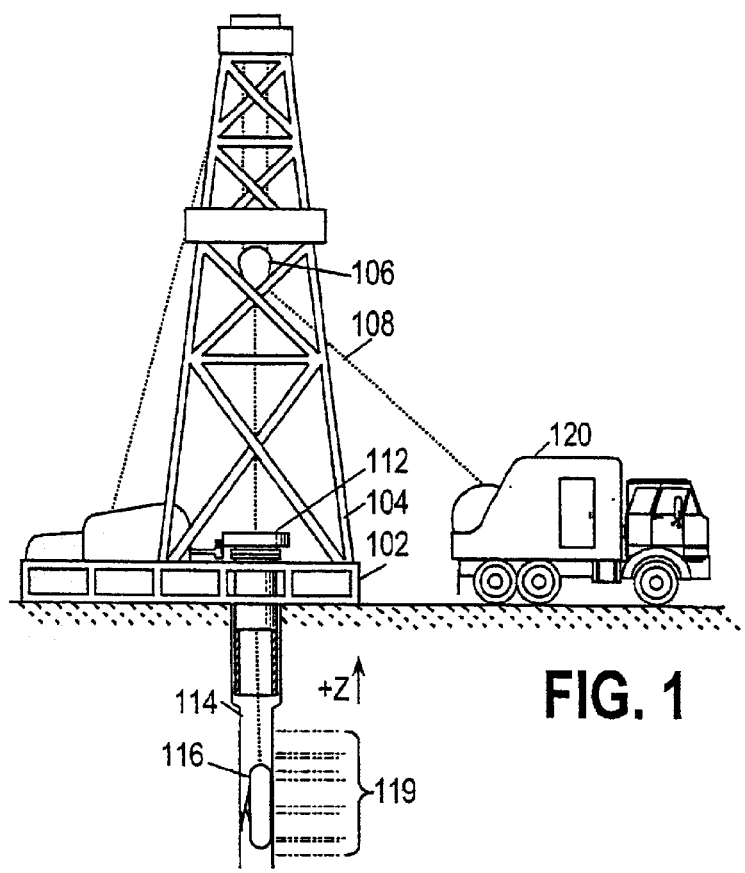
FIG. 1 shows the environment of a wireline logging operation.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Terminology

It is noted that the terms horizontal and vertical as used herein are defined to be those directions parallel to and perpendicular to the bedding plane, respectively.

Tool Configuration

Turning now to the figures, FIG. 1 shows a well during wireline logging operations. A drilling platform 102 is equipped with a derrick 104 that supports a hoist 106. Drilling of oil and gas wells is carried out with a drill string that is normally supported by hoist 106 and rotated by rotary table 112. A drill bit on the end of the drill string gradually drills out a well bore 114. As the well bore 114 is drilled, drilling fluid (often called "mud") is circulated through the drill string and back along the annulus between the drill string and the well bore. During wireline logging operations, the drill string is removed from the well bore 114, and an instrument sonde 116 is lowered into the mud-filled well bore 114.

The sonde 116 is suspended by a wireline cable 108 as it is lowered and retrieved. The wireline cable transports command and telemetry signals between the sonde 116 and the surface installation 120. The surface installation 120 preferably includes a data acquisition and storage unit (not specifically shown) for recording logging data received from the sonde 116. The data acquisition and storage unit may take the form of a computer, which may also provide in-field processing of the logging data.

After the sonde 116 is lowered to the bottom of the well bore (or at least below the region of interest), the biasing elements are deployed. The biasing elements ensure contact with the wall of the wellbore as the sonde moves uphole. As the sonde 116 moves uphole, it performs logging operations designed to measure one or more characteristics of the formations 119 surrounding the well bore 114.

Figure 2:
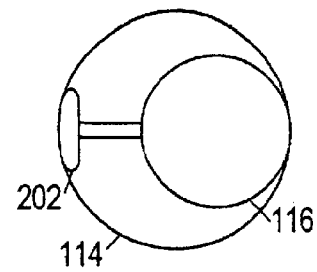
FIG. 2 shows an end view of a first logging tool embodiment in a borehole.

FIG. 2 shows an end view of sonde 116 with a preferred biasing element configuration. In this configuration, an arm is extended to press a slider pad 202 against one wall of well bore 114. Slider pad 202 is preferably a measurement pad as described further below. Contact is assured by extending the arm a sufficient distance to make the width of the tool equal to the diameter of the well bore 114. The arm is preferably spring-biased against the wall to maintain contact despite irregularities in the well bore.

Figure 3:
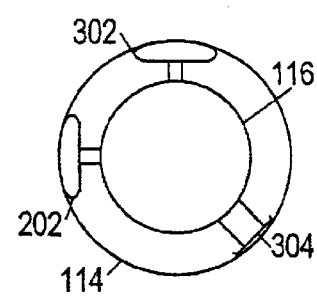
FIG. 3 shows an end view of a second logging tool embodiment in a borehole.

FIG. 3 shows an end view of sonde 116 with an alternative biasing element configuration. In this configuration, the sonde 116 is maintained roughly in the center of the well bore 114 through the use of multiple biasing elements. At least two of these elements are preferably slider pads 202, 302 that perform measurements at orthogonal azimuthal angles as described further below. The total number of biasing elements is preferably at least three, and this number may include slider pads 304 that do not perform measurements.

It is noted that many suitable biasing element configurations are known in the art and may be created in the future. Suitable biasing elements may include spring arms, bow springs, and balloons. The use of different types and numbers of biasing elements is contemplated in alternative embodiments.

Figure 4:
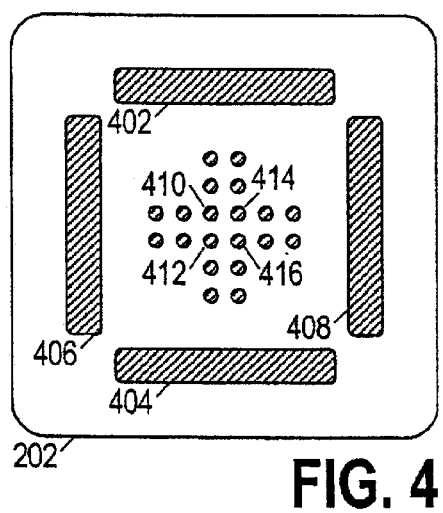
FIG. 4 shows a preferred electrode configuration.

FIG. 4 shows a proposed electrode configuration of a measurement pad for a novel oil-based mud imaging (OBMI) tool. OBMI tools are useful for obtaining a high-resolution measurement of formation resistivity in formations surrounding a well bore when the well bore contains a nonconductive drilling mud. A detailed discussion regarding existing OBMI tools may be found in U.S. Pat. No. 6,191,588, issued Feb. 20, 2001 with inventor M. Y. Chen, which patent is hereby incorporated herein by reference.

In the proposed electrode configuration of FIG. 4, a current source electrode 402 is disposed horizontally along the upper edge of the configuration, and a current drain electrode 404 is disposed horizontally along the lower edge of the configuration. A current source driver (not shown) is coupled between the source and drain electrodes to force a predetermined amount of current to flow from the source 402 to the drain 404.

A second current source electrode 408 is disposed vertically along the right edge of the configuration, and a current drain electrode 406 is disposed vertically along the left edge of the electrode configuration. A second current source driver (not shown) is coupled between the source and the drain electrodes to force a predetermined amount of current to flow from the source 408 to the drain 406.

The current source drivers may drive AC and/or DC currents between the source and drain electrodes. The current source drivers may operate concurrently, or alternatively, they may operate in time-multiplexed fashion (i.e. they may take turns operating). If the current source drivers operate concurrently, it is preferred that they provide AC currents at different frequencies, but this is by no means required.

A set of measurement electrodes is provided in the region between the source and drain electrodes. Each of the electrodes is coupled to a respective high-input-impedance amplifier and analog-to-digital converter (not shown) that measure the voltage signal from that measurement electrode. The sampled voltages may be processed downhole, and in any event, are communicated to the surface data acquisition and storage unit.

In the set of measurement electrodes shown in FIG. 4, four measurement electrodes 410–416 are identified in particular. These measurement electrodes are symmetrically located with respect to the horizontal and vertical centerlines of the electrode configuration, and are proximate to the center of the electrode configuration. The voltages from these electrodes can be used to estimate desired measurement voltages as described further below.

The electrode configuration of FIG. 4 is preferably located on (or in) a nonconductive surface that contacts the wall of the well bore 114. Accordingly, the surface may (for example) be a ceramic, plastic, or rubber surface having a curvature designed to match the curvature of the well bore wall.

Figure 5:
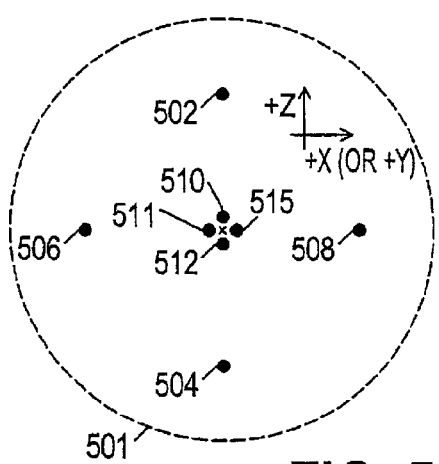
FIG. 5 shows a model of an electrode configuration.

FIG. 5 shows an idealized model 501 of the electrode configuration. In the idealized model, the electrodes are point contacts. Source electrode 402 is modeled as a point current source 502, drain electrode 404 is modeled as a point current drain 504, source electrode 408 is modeled as a point current source 508, and drain electrode 406 is modeled as a point current drain 506. In the model 501, voltage measurements are made at points 510 and 512, which are closely spaced measurement points located on centerline between points 502 and 504, and located symmetrically with respect to a centerline between points 506 and 508. Similarly, voltage measurements are made at points 515 and 511, which are closely spaced measurement points located on the centerline between points 506 and 508, and located symmetrically with respect to the centerline between points 502, 504.

The model measurement voltages can be estimated in a number of ways. In one embodiment, the model measurement at point 510 is estimated by the actual measurement at electrode 410, and the model measurement at point 512 is estimated as the actual measurement at electrode 412. The model measurement at point 511 is estimated as the actual measurement at electrode 410, and the model measurement at point 515 is estimated as the actual measurement at electrode 414.

In alternative embodiments, the model measurements can be estimated by averaging. For example, the model measurement at point 511 can be estimated by averaging the actual measurements at electrodes 410 and 412. Similarly, the model measurement at point 515 can be estimated by averaging the actual measurements at electrodes 410 and 416.

In the idealized model, the curvature and size of the measurement pad 202 may be ignored. It has been found that good results are obtained when the electrode configuration is assumed to lie on an infinite, planar, nonconductive surface. The model coordinates are defined with respect to the formation, so that the z-axis is perpendicular to bedding plane, the x-axis is parallel to the bedding plane and parallel to the (planar) surface of the measurement pad (e.g. pad 202). The y-axis is also parallel to the bedding plane and parallel to the surface of the measurement pad (e.g. pad 302), but is perpendicular to the x-axis.

When the formation dips with respect to the borehole, additional processing may be necessary to determine the idealized measurements from the actual measurements. Such processing is somewhat tedious, and in any event, is expected to be well within the abilities of one of ordinary skill in the art. Accordingly, the following derivation proceeds with the assumption that the model axes are aligned with the formation axes.

When a current is driven from source 502 to drain 504, the potential (i.e. voltage) produced at the measurement point 510 can be expressed in terms of an integral equation solution over the surface $S_0$ of the pad on which the electrodes are placed. The following integral equation represents the solution for the potential in terms of the source vector $r_0^S$ (the vector from the center of the configuration to point 502) and the measurement vector r (the vector from the center to point 510):

$$V(r) = \frac{1}{4\pi} \int_{S_0} [V(r_0^S) \cdot \sigma \nabla_0 G(r, r_0^S) - G(r, r_0^S) \cdot \sigma \nabla_0 V(r_0^S)] \cdot n_0 dS_0 \quad (1)$$

where $n_0$ is a unit vector that is perpendicular to the surface if the pad, and $\sigma$ is a conductivity tensor that (in the uniaxial case) is represented as $$\sigma = \begin{pmatrix} \sigma_h & 0 & 0 \\ 0 & \sigma_h & 0 \\ 0 & 0 & \sigma_v \end{pmatrix}, \quad (2)$$

with the vertical conductivity component $\sigma_v$ being directed along the positive z-axis (FIG. 5).

The term $G(r, r_0^S)$ is the following Green's function:

$$G(r, r_0) = \frac{\lambda}{\sigma_h}\left(\frac{1}{R} + \frac{1}{R'}\right), \quad (3)$$

where the source and image distances are given by $$R = \sqrt{(x-x_0)^2 + (y-y_0)^2 + \lambda^2(z-z_0)^2}, \quad (4)$$

$$R' = \sqrt{(x-x_0)^2 + (y+y_0)^2 + \lambda^2(z-z_0)^2}.$$

The anisotropy coefficient in the above equations is defined in the usual manner, $\lambda=\sqrt{\sigma_h/\sigma_v}$. Since the gradient of the Green's function vanishes on the surface of the pad by choice, the solution for the potential produced by a unit current source located at $(0,0,z_0)$ (i.e. the coordinates of point 502) for a measurement point $(0,0,z_m)$ (i.e. point 510) is:

$$V_z = \frac{1}{2\pi\sigma_h}\frac{1}{|z_m-z_0|}. \quad (5a)$$

Similarly, a unit current source located at $(x_0,0,0)$ (i.e. point 508) produces the following potential at $(X_m,0,0)$ (i.e. point 515):

$$V_x = \frac{\lambda}{2\pi\sigma_h}\frac{1}{|x_m-x_0|}, \quad (5b)$$

The apparent z-axis resistivity $R_a^z$ (which corresponds to the horizontal formation resistivity) may be determined by multiplying the measured potential in equation (5a) by the following tool constant $$K_{tool}^z = 2\pi|z_m - z_0|. \quad (6a)$$

Similarly, the apparent x-axis resistivity $R_a^x$ may be determined by multiplying the measured potential in equation (5b) by the following tool constant:

$$K_{tool}^x = 2\pi|x_m - x_0|. \quad (6b)$$

The formation anisotropy can then be calculated as $$\lambda = \frac{R_a^x}{R_a^z}. \quad (7)$$

The theory can be applied to the OBMI tool by recognizing that the measurement of the voltage difference (e.g. the difference between points 510 and 512) is the difference between theoretical measurements caused by the source and sink individually. If the source and sink electrodes are symmetrically placed and the measure electrodes are also symmetrically placed, the measured horizontal and vertical differences can be expressed as $$V_{OBMI}^x = \frac{\lambda}{\pi\sigma_h}\left[\frac{1}{|x_m-x_0|} - \frac{1}{|x_m+x_0|}\right], \quad (8a)$$

$$V_{OBMI}^z = \frac{1}{\pi\sigma_h}\left[\frac{1}{|z_m - z_0|} - \frac{1}{|z_m + z_0|}\right]. \quad (8b)$$

The apparent x-axis resistivity $R_a^x$ can be calculated by multiplying the measured voltage difference in equation (8a) by the following tool constant:

$$K_{OBMI}^x = \pi\frac{|x_m - x_0||x_m + x_0|}{|x_m - x_0| - |x_m + x_0|}, \quad (9a)$$

and the apparent z-axis resistivity $R_a^z$ (which corresponds to the horizontal formation resistivity $\rho_h$) can be calculated by multiplying the measured voltage difference in equation (8b) by:

$$K_{OBMI}^z = \pi\frac{|z_m - z_0||z_m + z_0|}{|z_m - z_0| - |z_m + z_0|}. \quad (9b)$$

The anisotropy coefficient $\lambda$ is calculated as provided in equation (7). The vertical formation resistivity $\rho_v$ can then be calculated from the definition of the anisotropy coefficient.

The above equations provide a solution for the uniaxial anisotropy case. If it is desired to measure biaxial anisotropy, then a second measurement pad may be provided at right angles to the first measurement pad (see, e.g., FIG. 3), so that resistivity measurements may be made along the y-axis. Beginning again from equation (1), the conductivity tensor for the biaxial case is represented as $$\sigma = \begin{pmatrix} \sigma_x & 0 & 0 \\ 0 & \sigma_y & 0 \\ 0 & 0 & \sigma_z \end{pmatrix}, \quad (10)$$

with the vertical conductivity component $\sigma_z$ being directed along the z-axis. The appropriate Green's function is given as:

$$G(r, r_0) = \sqrt{\rho_x\rho_y\rho_z}\left(\frac{1}{R} + \frac{1}{R'}\right), \quad (11)$$

with the source and image distances given by $$R = \sqrt{\rho_x(x - x_0)^2 + \rho_y(y - y_0)^2 + \rho_z(z - z_0)^2}, \text{ and} \quad (12a)$$

$$R' = \sqrt{\rho_x(x - x_0)^2 + \rho_y(y + y_0)^2 + \rho_z(z - z_0)^2}. \quad (12b)$$

The theoretical measurement potentials on the first measurement pad are:

$$V_x = \frac{1}{2\pi|x_m - x_0|}\sqrt{\rho_y\rho_z}, \text{ and} \quad (13a)$$

$$V_z = \frac{1}{2\pi|z_m - z_0|}\sqrt{\rho_x\rho_y}. \quad (13b)$$

The theoretical measurement potential on the second pad is:

$$V_y = \frac{1}{2\pi|y_m - y_0|}\sqrt{\rho_x\rho_z}. \quad (13c)$$

From these equations, the expected voltage differences from the OBMI tool can be expressed as:

$$V_{OBMI}^x = \sqrt{\rho_y\rho_z}\left[\frac{1}{\pi|x_m - x_0|} - \frac{1}{\pi|x_m + x_0|}\right] \quad (14a)$$

$$V_{OBMI}^y = \sqrt{\rho_x\rho_z}\left[\frac{1}{\pi|y_m - y_0|} - \frac{1}{\pi|y_m + y_0|}\right] \quad (14b)$$

$$V_{OBMI}^z = \sqrt{\rho_x\rho_y}\left[\frac{1}{\pi|z_m - z_0|} - \frac{1}{\pi|z_m + z_0|}\right]. \quad (14c)$$

The apparent resistivities $R_a^x, R_a^y, R_a^z$ can be determined by multiplying the measured voltage differences in equations (14a)–(14c) by the respective one of the following tool coefficients:

$$K_{OBMI}^x = \frac{\pi|x_m - x_0||x_m + x_0|}{|x_m - x_0| - |x_m + x_0|} \quad (15a)$$

$$K_{OBMI}^y = \frac{\pi|y_m - y_0||y_m + y_0|}{|y_m - y_0| - |y_m + y_0|} \quad (15b)$$

$$K_{OBMI}^z = \frac{\pi|z_m - z_0||z_m + z_0|}{|z_m - z_0| - |z_m + z_0|} \quad (15c)$$

Note that the tool coefficients are of the same form as those provided in equations (9a), (9b) (the uniaxial case). The formation resistivities $\rho_x, \rho_y, \rho_z$ can be calculated from the apparent resistivities $R_a^x, R_a^y, R_a^z$ as follows:

$$\rho_x = \frac{R_a^y R_a^z}{R_a^x}, \quad (16a)$$

$$\rho_y = \frac{R_a^x R_a^z}{R_a^y}, \quad (16b)$$

$$\rho_z = \frac{R_a^x R_a^y}{R_a^z}, \quad (16c)$$

The formation anisotropies $\rho_{xz}, \rho_{yz}$ can then be calculated from the formation resistivities in accordance with their definitions.

It is expected that the discrepancies between the model and the actual tool (e.g. the curvature and finite extent of the measurement pads) will make it desirable to adjust the tool coefficients slightly to obtain the best results. Also, recall that the derivation above assumed a unit current value, so the measurements should be normalized with respect to the current. One method for determining the optimal tool coefficients is to calibrate the tool measurements in known environments.

Figure 6:
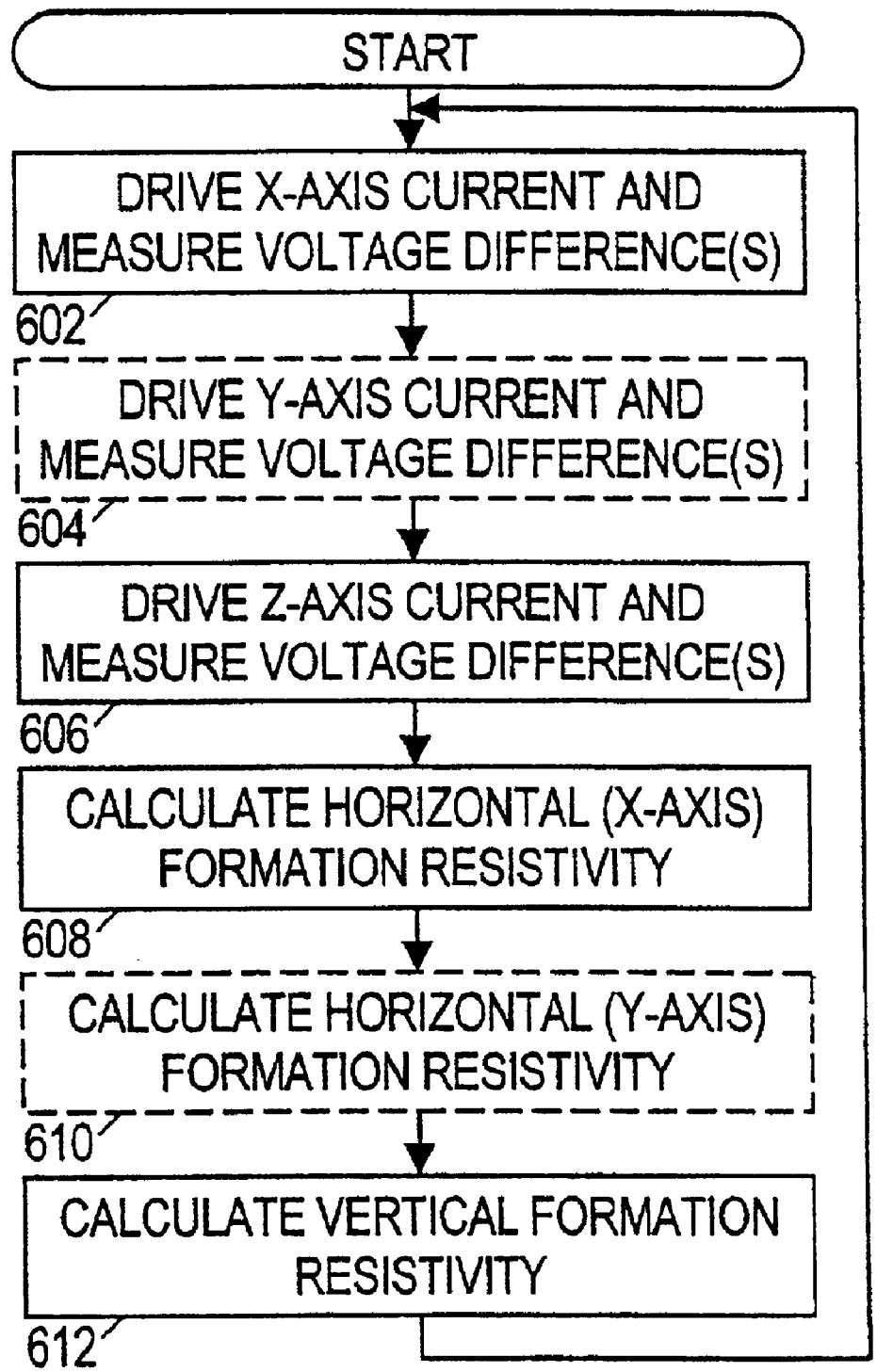
FIG. 6 shows a flowchart of a preferred method embodiment.

Turning now to FIG. 6, the preferred method is described. The logging tool is placed in a well bore, and logging is commenced as the tool moves along the well bore. In block 602, a current is driven between the horizontal current electrodes of a given measurement pad (e.g. electrodes 406, 408, of pad 202), and a voltage difference is measured in the x-axis direction. The voltage difference may be measured directly (e.g. between measurement electrodes 410, 414, of pad 202), or may be determined from voltages of more than two measurement electrodes. The latter approach may offer improved signal-to-noise ratios and/or enhanced reliability.

In block 604 a current is driven between the horizontal current electrodes of a second A measurement pad (e.g. electrodes 406, 408, of pad 302), and a voltage difference is measured in the y-axis direction. As before, the measurement may be made directly (e.g. between measurement electrodes 410, 414, of pad 302), or may be determined from a combination of multiple measurements. Block 604 is shown in broken outlines because it is optional, i.e. it may be omitted if only uniaxial anisotropy measurements are desired.

In block 606, a current is driven between the vertical current electrodes of a measurement pad (e.g. electrodes 402, 404 of pad 202), and a voltage difference is measured in the z-axis direction. Again, the measurement may be made directly (e.g. between measurement electrodes 410, 412 of pad 202) or by combining multiple measurements. Note that the actions of blocks 602–604 may be performed sequentially, or alternatively one or more of the block actions may be performed concurrently. Thus, for example, the x-axis and z-axis measurements may be made concurrently.

In block 608, a horizontal (x-axis) formation resistivity is calculated. This may be done in various ways. For the uniaxial anisotropy case, the apparent vertical resistivity may be calculated by multiplying the z-axis measurement by the z-axis tool constant:

$$\rho_h = R_a^z = K_{OBMI}^z V_{OBMI}^z. \qquad (17)$$

For the bi-axial anisotropy case, the apparent resistivities along all three axes may be calculated and combined in accordance with equation (16a).

In block 610, the horizontal (y-axis) formation resistivity is calculated. This is only done for the biaxial case, and is preferably determined in accordance with equation (1 6b).

In block 612, the vertical (z-axis) formation resistivity is calculated. For the uniaxial case, this may be done by determining the anisotropy in accordance with equation (7), then combining the anisotropy with the calculated horizontal resistivity:

$$\rho_v = \lambda^2 \lambda_h. \qquad (18)$$

In the biaxial case, the z-axis resistivity is preferably determined in accordance with equation (16c). The process preferably repeats periodically as the logging tool moves along the borehole.

It is noted that the actions in blocks 608–612 may be performed sequentially as shown, or alternatively they may be performed concurrently with some of the actions of blocks 602–606. Further, the actions in blocks 608–612 may be performed at some time after all of the logging tool measurements have been made and recorded.

Numerous variations and modifications will become apparent to those skilled in the art once the above disclosure is fully appreciated. For example, it is expected that a typical OBMI tool may have many more measurement pads than shown in the figures. It is expected that various advantages may be realized by combining measurements from more than one or two pads. Additionally some processing may be applied to determine voltage differences that would align with the resistivity axes of the formation even when the tool axes deviate from these axes. It is intended that the following claims be interpreted to embrace all such variations and modifications.

What is claimed is:

1. A method for measuring resistive anisotropy of a formation, the method comprising:
   inserting a logging tool in a well bore that penetrates the formation, wherein the logging tool has at least one set of electrodes that contact a well bore wall;
   driving a current between a vertically-spaced electrode pair;
   determining a vertical voltage difference between two vertically-spaced measurement points located between the vertically-spaced electrode pair;
   driving a current between a horizontally-spaced electrode pair;
   determining a horizontal voltage difference between two horizontally-spaced measurement points located between the horizontally-spaced electrode pair;
   multiplying the vertical voltage difference with a first tool coefficient to determine an apparent vertical resistivity; and
   multiplying the horizontal voltage difference with a second tool coefficient to determine an apparent horizontal resistivity; and
   calculating a formation anisotropy from a ratio of the apparent horizontal resistivity to the apparent vertical resistivity.

2. The method of claim 1, wherein the determining a horizontal voltage difference includes combining measurements from multiple electrodes located symmetrically with respect to a midpoint between the horizontally-spaced electrode pairs.

3. A method for measuring resistive anisotropy of a formation, the method comprising:
   inserting a logging tool in a well bore that penetrates the formation, wherein the logging tool has at least one set of electrodes that contact a well bore wall;
   driving a current between a vertically-spaced electrode pair;
   determining a vertical voltage difference between two vertically-spaced measurement points located between the vertically-spaced electrode pair;
   driving a current between a horizontally-spaced electrode pair;
   determining a horizontal voltage difference between two horizontally-spaced measurement points located between the horizontally-spaced electrode pair;
   driving a current between a second horizontally-spaced electrode pair, wherein the second horizontally-spaced electrode pair is substantially orthogonal to the first horizontally-spaced electrode pair;
   determining a second horizontal voltage difference between two horizontally spaced measurement points located between the second horizontally-spaced electrode pair;
   multiplying the first horizontal voltage difference with a first tool coefficient to determine an apparent x-axis resistivity;
   multiplying the second horizontal voltage difference with a second tool coefficient to determine an apparent y-axis resistivity;
   multiplying the vertical voltage difference with a third tool coefficient to determine an apparent z-axis resistivity,
   calculating an x-axis formation resistivity from the apparent resistivities;
   calculating a y-axis formation resistivity from the apparent resistivities; and
   calculating a z-axis formation resistivity from the apparent resistivities, determining biaxial anisotropy values from the calculated formation resistivities.

4. The method of claim 3, wherein the vertically-spaced electrode pair is located on a first measurement pad along with the first horizontally-spaced electrode pair, and wherein the second horizontally-spaced electrode pair is located on a second, different measurement pad that contacts the well bore wall.

5. A method for measuring resistive anisotropy of a formation, the method comprising:
- inserting a logging tool in a well bore that penetrates the formation, wherein the logging tool has at least one set of electrodes that contact a well bore wall;
- driving a current between a vertically-spaced electrode pair;
- determining a vertical voltage difference between two vertically-spaced measurement points located between the vertically-spaced electrode pair;
- driving a current between a horizontally-spaced electrode pair; and
- determining a horizontal voltage difference between two horizontally-spaced measurement points located between the horizontally-spaced electrode pair,
- wherein the current between the vertically-spaced electrode pair has a different frequency than the current driven between the horizontally-spaced electrode pair.

6. A system for measuring the resistive anisotropy of earth formations surrounding a borehole, wherein the system comprises:
- a logging tool having a set of electrodes that contact a wall of the borehole, wherein the set includes;
- a first pair of electrodes spaced apart along a first axis;
- two or more measurement electrodes spaced apart along the first axis between the first pair of electrodes;
- a second pair of electrodes spaced apart along a second axis substantially perpendicular to the first axis; and
- two or more measurement electrodes spaced apart along the second axis between the second pair of electrodes; and
- a surface unit configured to receive periodic measurements of a first axis voltage difference as indicated by the two or more measurement electrodes spaced apart along the first axis when a current is driven between the first pair of electrodes, and to receive periodic measurements of a second axis voltage difference as indicated by the two or more measurement electrodes spaced apart along the second axis when a current is driven between the second pair of electrodes,
- wherein the surface unit is also configured to determine an apparent resistivity along the first axis from a product of the first axis voltage difference and a first tool coefficient, and to determine an apparent resistivity along the second axis from a product of the second voltage difference and a second tool coefficient, and
- wherein the surface unit is further configured to calculate a formation anisotropy from a ratio of the apparent resistivities along the first and second axes.

7. The system of claim 6, wherein drilling fluid contained in the borehole is oil-based.

8. A system for measuring the resistive anisotropy of earth formations surrounding a borehole, wherein the system comprises:
- a logging tool having a set of electrodes that contact a wall of the borehole, wherein the set includes;
- a first pair of electrodes spaced apart along a first axis;
- two or more measurement electrodes spaced apart along the first axis between the first pair of electrodes;
- a second pair of electrodes spaced apart along a second axis substantially perpendicular to the first axis; and
- two or more measurement electrodes spaced apart along the second axis between the second pair of electrodes; and
- a surface unit configured to receive periodic measurements of a first axis voltage difference as indicated by the two or more measurement electrodes spaced apart along the first axis when a current is driven between the first pair of electrodes, and to receive periodic measurements of a second axis voltage difference as indicated by the two or more measurement electrodes spaced apart along the second axis when a current is driven between the second pair of electrodes,
- wherein the logging tool has a second set of electrodes oriented orthogonal to the first set, and wherein the second set of electrodes includes:
  - a third pair of electrodes spaced along a third axis substantially perpendicular to the first two axes; and
  - two or more measurement electrodes space apart along the third axis between the third pair of electrodes,
- wherein the surface unit is configured to receive periodic measurements of a third axis voltage difference as indicated by the two or more measurement electrodes spaced apart along the third axis when a current is driven between the third pair of electrodes,
- wherein the surface unit is further configured to determine an apparent resistivity along the first axis from a product of the first axis voltage difference and a first tool coefficient, to determine an apparent resistivity along a second axis from a product of the second axis voltage difference and a second tool coefficient, and to determine an apparent resistivity along a third axis from a product of the third axis voltage difference and a third tool coefficient, and
- wherein the surface unit is further configured to calculate biaxial anisotropy values from the apparent resistivities along the three axes.

9. An apparatus chat comprises:
- a first electrode means for driving a current through a borehole wall along a first axis;
- a first measurement means for measuring a first voltage difference caused by current flow along the first axis;
- a second electrode means for driving a current through a borehole wall along a second axis perpendicular to the first axis;
- a second measurement means (or measuring a second voltage difference caused by current flow along the second axis; and
- a calculating means for determining resistive anisotropy along the first and second axes.

10. The apparatus of claim 9, further comprising:
- a third electrode means for driving a current through a borehole wall along a third axis perpendicular to the first and second axes; and
- a third measurement means for measuring a third voltage difference caused by current flow along the third axis,
- wherein the calculating means is also for determining biaxial resistive anisotropy the third axis.

11. The apparatus of claim 9, wherein the currents from the first and second electrode means have different frequencies.

* * * * *